United States Patent [19]

Santore

[11] 4,270,367
[45] Jun. 2, 1981

[54] SPRING LOADED ADJUSTABLE COUPLING

[76] Inventor: Michael Santore, 1000 Eastwind Ave., Toms River, N.J. 08753

[21] Appl. No.: 17,463

[22] Filed: Mar. 5, 1979

Related U.S. Application Data

[63] Continuation-in-part of Ser. No. 883,203, Mar. 3, 1978, abandoned.

[51] Int. Cl.³ ............................................. F16D 3/06
[52] U.S. Cl. ......................................... 64/23; 403/109
[58] Field of Search ....................... 64/23, 23.6, 9 R, 8; 403/109

[56] References Cited

U.S. PATENT DOCUMENTS

| | | | |
|---|---|---|---|
| 2,113,651 | 4/1938 | Heaston | 64/23 |
| 2,468,182 | 4/1949 | Dempsey | 64/23 |
| 2,977,777 | 4/1961 | Bernitz | 64/23 |
| 3,069,875 | 12/1962 | Crum, Jr. | 64/23 |
| 3,367,138 | 2/1968 | Tiedeman | 64/23 |
| 3,367,140 | 2/1968 | Stillwagon, Jr. | 64/23 |

FOREIGN PATENT DOCUMENTS

| | | | |
|---|---|---|---|
| 195361 | 1/1958 | Fed. Rep. of Germany | 64/23 |
| 804075 | 10/1936 | France | 64/23 |
| 216906 | 6/1924 | United Kingdom | 64/23 |

*Primary Examiner*—Ira S. Lazarus
*Assistant Examiner*—Magdalen Moy
*Attorney, Agent, or Firm*—Donald R. Heiner

[57] ABSTRACT

A spring loaded, axially slidable, adjustable coupling adapted at one end to fit over a drive means shaft, such as a motor, and adapted at the other end to fit over a driven shaft, such as a pump shaft, wherein this end can receive shafts of varying diameters. The device comprises essentially a hollow cylinder adapted at one end to fit over a drive shaft, a coil spring disposed in the cylinder, a groove formed in the cylinder for nearly its entire length, a second groove formed in the cylinder for nearly its entire length and located 180° from the first groove, a locking device which extends into the two (2) grooves for positioning and holding the spring, and a second cylinder slidably disposed in the first cylinder for compressing the spring. The end of the second cylinder distant from the spring is adapted to fit over driven shafts of various diameters. Both the first and second cylinders have flanges formed on one (1) end thereof and both have longitudinally extending ribs disposed thereon and spaced 90° from the grooves formed in the second cylinder such that equal pressure is distributed on four (4) pressure points of the cylinders when a torque or rotating force is applied to the coupling.

2 Claims, 7 Drawing Figures

U.S. Patent
Jun. 2, 1981
4,270,367
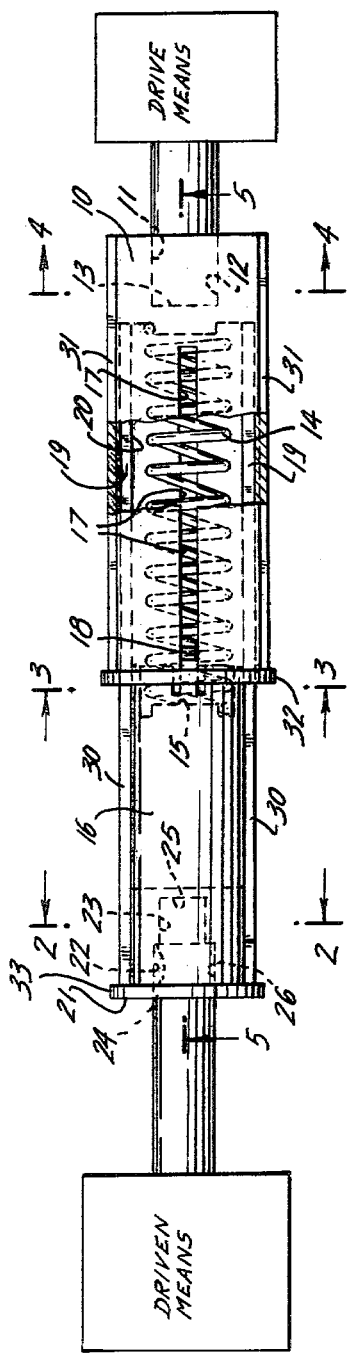
FIG. 1
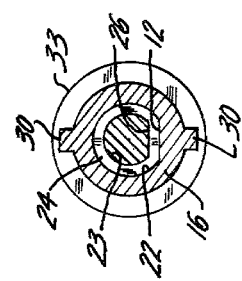
FIG. 2
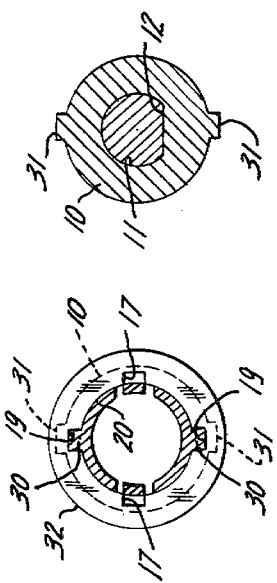
FIG. 4
FIG. 3
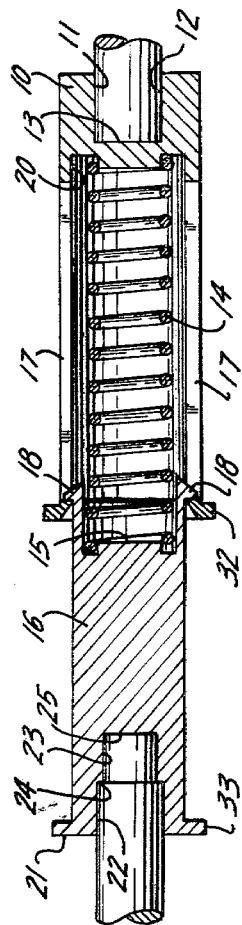
FIG. 5
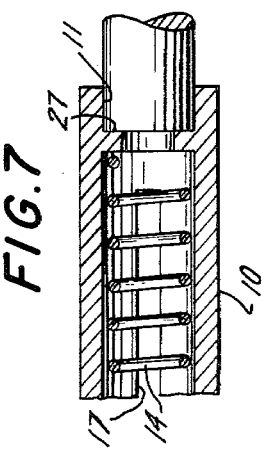
FIG. 7
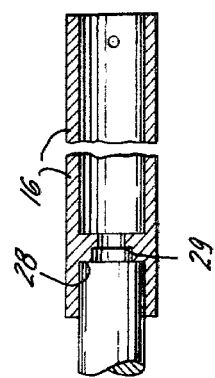
FIG. 6

SPRING LOADED ADJUSTABLE COUPLING

BACKGROUND OF THE INVENTION

The present invention is a continuation in part of my co-pending application Ser. No. 883,203 filed Mar. 3, 1978 entitled "Spring Loaded Adjustable Coupling" now abandoned.

The present invention relates generally to the field of couplings and more particularly to couplings for connecting a drive means, such as a motor or engine, to a driven means, such as a pump, compressor, turbine, etc. The coupling is made to slidably fit over the drive shaft, by compressed by means of a coil spring, and then fit over the driven shaft which may be of varying diameters. The device allows for snapping the coupling in place without tools and without the necessity of using fasteners such as set screws, bolts and the like. Further, the spring automatically allows for the axial distance between the end of the drive shaft and the end of the driven shaft.

The Coupling comprises essentially a hollow outer cylinder adapted at one end to slidably fit over a drive shaft, a coil spring disposed in the cylinder, two axially extending grooves formed in the cylinder 180° apart, an interlocking struck up portion of the inner cylinder which cooperates with the spring and slides in the grooves for positioning and holding a spring, and, a second or inner cylinder slidably disposed in the outer cylinder for compressing the spring when an inward force is exerted on the free end of the inner cylinder. The free end of the second or inner cylinder is adapted to fit over driven shafts of different diameters. An adapter can be provided which fits into the free end of the inner cylinder, and, in turn, the adapter's free end can be adapted to slidably fit over driven shafts of different diameters. The second or inner cylinder has longitudinally extending ribs formed on the outer diameter thereof which are spaced 90° apart from the axially extending grooves formed in the cylinder which slidably cooperate with grooves extending longitudinally internally of the hollow outer cylinder to form an interlocking device which will act as pressure points to evenly distribute the stress when a torque is applied to the cylinders. Both the inner and outer cylinders have flanges formed on one end thereof.

SUMMARY OF THE INVENTION

Briefly, the invention relates to a coupling for rotatably connecting a drive shaft to a driven shaft without the necessity of using tools such as screw drivers wrenches and without using fasteners such as set screws or bolts and which is adapted to fit over driven shafts, such as pump shafts, having 5/16" or 7/16" diameters without having to provide a complete new coupling nor an adapter. Further, the axial distance between the ends of the drive and driven shafts is automatically compensated for by a coil spring. The coupling, which comprises an inner and outer cylinder, with a spring disposed between the two, slidably fits over a drive shaft at one end and a driven shaft at the other.

Accordingly, it is an object of the invention to provide a spring loaded coupling.

Another object of the invention is to provide a spring loaded coupling which slidably fits over a drive and driven shaft.

Another object of the invention is to provide a spring loaded coupling which slidably fits over a drive and driven shaft wherein the end that fits over the driven shaft can be adapted to receive shafts of various diameters.

Another object of the invention is to provide a spring loaded coupling wherein the axial distance between the ends of the drive and driven shaft is compensated for by a spring.

Another object of the invention is to provide a spring loaded coupling wherein when a rotating torque is applied to the coupling the pressure or stress is equally distributed to four (4) pressure points.

These and other objects and advantages of the invention are believed made clear by the following description thereof taken in conjunction with the accompanying drawings wherein;

IN THE DRAWINGS

FIG. 1 is a side elevation of the assembled coupling.
FIG. 2 is an end view taken on line 2—2 of FIG. 1.
FIG. 3 is an end view taken on line 3—3 of FIG. 1.
FIG. 4 is an end view taken on line 4—4 of FIG. 1.
FIG. 5 is a cross section of FIG. 1 taken on line 5—5.
FIG. 6 is a cross section of a second embodiment of the slidable member.
FIG. 7 is a cross section of a second embodiment of the outer cylinder.

Referring now to the drawings, there is shown in FIG. 1 a side elevation of the coupling of the instant invention showing the components thereof in an assembled and cooperating position.

A hollow cylinder is shown at 10 having an opening 11 in one end thereof to slidably receive a drive shaft such as a motor shaft, engine shaft, etc. A flat 12 is formed in the opening to slidably receive a similar surface formed on the outside diameter of most drive shafts. When this cylinder is slid over the drive shaft, the drive shaft will come to rest against a solid wall 13 formed internally of the cylinder to stop the drive shaft from entering the cylinder 10. A coil spring 14 is disposed inside cylinder 10 and abuts against wall 13 at one end and against end 15 of a slidable member 16 at its other end. Two axially extending slots 17 are formed in the cylinder 10, 180° apart, and nearly the entire length thereof. To struck up portions of guide clips 18 are formed on one end of the slidable member 16, located 180° apart, and cooperate with the two (2) slots 17 to position the coil spring 14 in place and to keep the slidable member 16 from becoming disengaged from cylinder 10. When a torque or rotating or centrifugal force is applied to the coupling the two guide clips also act as pressure points to more evenly distribute the force applied.

In this embodiment of the invention, slidable member 16 is solid and slidably engages the internal wall 20 of cylinder 10 where it is held in place by means of the guide clips 18 cooperating with slots 17 as previously explained. When this slidable member is pushed inwardly of hollow cylinder 10, guide clips 18 travel in the slots 17 thereby compressing coil spring 14 and shortening the length of the coupling.

The hollow cylinder 10 has two longitudinally extending grooves 19 formed internally thereof for nearly the entire length thereof for slidably receiving two ribs 30 formed on the outside diameter of slidable member 16 and extending longitudinally thereof. The longitudinally extending grooves 19 and the ribs 30 are located 90° away from the two axially extending slots 17. Thus, when a torque or rotating or centrifical force is applied to the coupling this rotating force is evenly applied to 4 points; the two guide clips 18 and the two ribs 30.

The combination of the guide clips 18 cooperating with slots 17 and the ribs 30 cooperating with grooves 19 further prevents the inner or slidable member 16 from rotating in the outer or hollow cylinder 10.

Also lending structural support to the coupling are two longitudinally extending ribs 31 formed on the outside diameter of hollow cylinder 10 and extending nearly the entire length thereof. These two ribs 31 are formed 90° away from the slots 17 and are co-axial with the grooves 19.

A flange 32 is formed on the outside diameter of one end of the hollow cylinder 10 and a similar flange 33 is formed on the outside diameter of one end of the slidable member 16.

The end 21 of slidable member 16, distant from the spring engaging end 15, has a plurality of shaft receiving openings 22 and 23 formed therein. Two openings are shown for convenience, it being understood that more than two (2) may be provided. This end 21 slidably engages the outside diameter of a driven shaft, such as a pump shaft. If this end is slid over a large diameter shaft, say 7/16 inch, the end of the shaft will abut first flange 24 formed internally of member 16. If this end is slid over a smaller diameter shaft, say 5/16 inch, the end of the shaft will abut second flange 25 formed internally of member 16. Each opening 22 and 23 has a flat 26 formed therein to slidably receive a similar surface formed on the outside diameter of most driven shafts.

In a second embodiment of the invention, solid wall 13 is replaced by a collar 27 formed internally of the cylinder 10 and the drive shaft and coil spring abut the collar on opposite sides thereof. Further, the first and second flanges 24 and 25 are replaced by collars 28 and 29 formed internally of end 21 of member 16 and the end of the driven or pump shaft will abut these collars. In this embodiment of the invention, 16 is not solid but rather is a hollow cylinder.

OPERATION

In operation, with a driven means, such as a motor, and a driven means, such as a pump, in place and ready to be rotably connected, the hollow cylinder is slid over the drive shaft until the end of the shaft abuts solid wall 13 or collar 27. Member 16 is now pushed into cylinder 10 thereby compressing coil spring 14 and shortening the length of the coupling. With the drive shaft and driven shaft properly aligned, member 16 is pulled axially of cylinder 10 and slid over the driven shaft until the driven shaft abuts flange 24, flange 25, or collars 28 or 29, as the case may be. The coupling is now in place with the coil spring allowing for the axial distance between the ends of the two shafts.

Thus, what has been described is a unique, spring loaded, axially slidable, coupling adapted to fit various size driven shafts wherein the coupling does not require fasteners or tools for connecting it to the drive and driven means.

It is to be understood that the invention is not to be restricted to the parts shown but that they may be widely varied within the invention as claimed.

What is claimed is:

1. A coupling for drivably connecting a drive shaft and driven shaft comprising:
   a. a hollow cylinder adapted at one end to receive a drive shaft;
   b. two longitudinally extending grooves formed internally of said hollow cylinder for nearly the entire length thereof;
   c. a slideable member for insertion into the other end of said hollow cylinder;
   d. two ribs formed on the outside diameter of said slideable member and extending longitudinally thereof for cooperating with said two longitudinally extending grooves formed internally of said hollow cylinder;
   e. a coil spring disposed in said hollow cylinder and compressable by said slideable member;
   f. driven shaft receiving means disposed in an end of said slideable member distant from said coil spring for receiving said drive shaft;
   g. said hollow cylinder further comprising two axially extending slots formed therein 180° apart for receiving two guide clips formed on one end of said slideable member to position the coil spring in place and to prevent the slideable member from becoming disengaged from said hollow cylinder and allowing said slideable member to move axially relative to said hollow cylinder for compressing said coil spring wherein said guide clips are located 180° apart and wherein said guide clips are each located 90° away from said longitudinally extending ribs formed on the outside diameter of said slideable member; and,
   h. two longitudinally extending ribs formed on the outside diameter of said hollow cylinder and extending nearly the entire length thereof wherein said ribs are formed 90° away from said two axially extending slots and which ribs are co-axial with said longitudinally extending grooves.

2. The coupling of claim 1 wherein a flange is formed on the outside diameter of one end of said hollow cylinder and a second flange is formed on the outside diameter of one end of said slideable member.

* * * * *